United States Patent [19]

Patterson

[11] Patent Number: 5,005,343
[45] Date of Patent: Apr. 9, 1991

[54] HEADER FOR A COMBINE HARVESTING MACHINE

[75] Inventor: Roger L. Patterson, Selkirk, Canada

[73] Assignee: MacDon Industries Ltd., Winnipeg, Canada

[21] Appl. No.: 380,536

[22] Filed: Jul. 17, 1989

Related U.S. Application Data

[63] Continuation-in-part of Ser. No. 209,901, Jun. 22, 1988, abandoned.

[51] Int. Cl.⁵ .............................................. A01D 34/40
[52] U.S. Cl. ...................................... 56/14.4; 56/14.5; 56/181
[58] Field of Search .................... 56/14.3, 14.4, 14.5, 56/153, 158, 181, 182, 183; 198/512, 513, 560, 568, 601, 604, 620

[56] References Cited

U.S. PATENT DOCUMENTS

| | | | |
|---|---|---|---|
| 875,385 | 12/1907 | Smith | 198/601 |
| 896,635 | 8/1908 | Griffin | 56/354 |
| 1,208,067 | 12/1916 | Williams | 198/601 |
| 1,400,688 | 12/1921 | Leonard | 460/16 |
| 1,725,939 | 8/1929 | Slice | 56/351 |
| 2,335,764 | 12/1942 | Innes | 56/350 |
| 2,389,193 | 11/1945 | Graves | 56/186 |
| 2,476,265 | 7/1949 | Peterson | 56/158 |
| 2,491,236 | 12/1949 | Waterman | 56/14.4 |
| 2,893,537 | 7/1959 | Krahn | 56/364 |
| 2,934,881 | 5/1960 | Noble | 56/158 |
| 3,118,265 | 1/1964 | Shaver | 56/14.4 |
| 3,324,639 | 6/1967 | Halls et al. | 56/14.4 |
| 3,478,499 | 11/1969 | Van der Lely | 56/14.3 |
| 3,921,785 | 11/1975 | Huitink | 56/14.3 |
| 4,487,004 | 12/1984 | Kejr | 56/14.4 |
| 4,512,140 | 4/1985 | Blakeslee | 56/11.6 |

Primary Examiner—Ramon S. Britts
Assistant Examiner—Terry L. Melius
Attorney, Agent, or Firm—Adrian D. Battison; Stanley G. Ade; Murray E. Thrift

[57] ABSTRACT

A flexible header for a combine or swather includes a pair of wing sections which can flex relative to a central section. Each wing section carries a draper canvas for transporting a cut crop inwardly toward the central section. Beneath the inner ends of the drapers is mounted a further draper for transporting the crop rearwardly through an opening in the central frame into the feeder housing of the combine. Above the central draper is mounted a roller member having a central paddle portion and auger portions outside of the central portion for confining and directing the crop in cooperation with the central draper into the feeder housing. The pivot axis of each wing portion is inclined inwardly and forwardly so that the axes intersect at the sickle knife. This arrangement allows the manufacture of a large width flexible combine header.

20 Claims, 6 Drawing Sheets

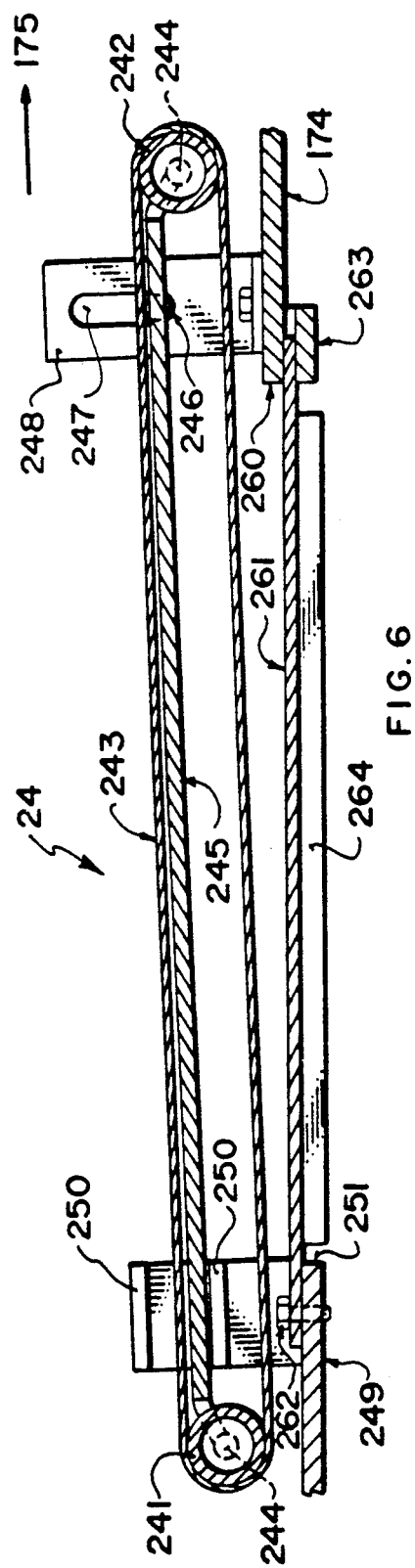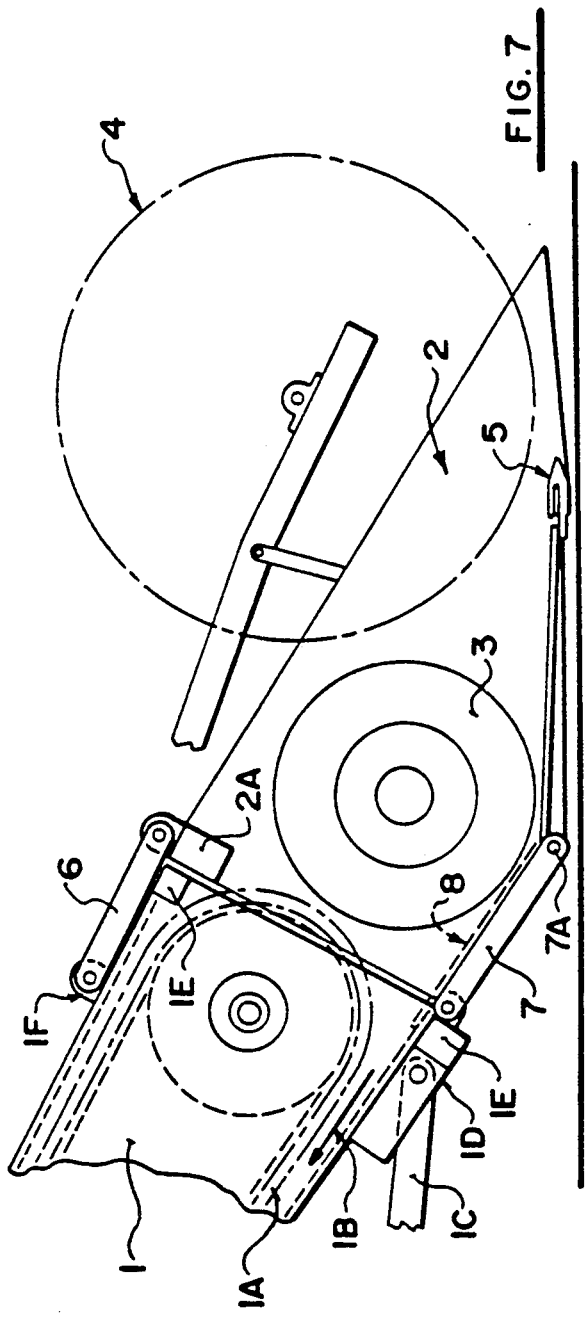

HEADER FOR A COMBINE HARVESTING MACHINE

This application is a continuation of application U.S. Ser. No. 209,901, filed June 22nd, 1988 now abandoned and is related to application U.S. Ser. No. 470,640, filed Jan. 25th, 1990 which is a continuation of the above application and is now issued as U.S. Pat. No. 4,956,966.

BACKGROUND OF THE INVENTION

This invention relates to a header for a harvesting machine of the type which can be moved in a working direction across a field including a standing crop to be harvested. Such devices can in some cases be used to directly combine the crop so that it is cut and passed into a combine body in which the grain is separated from the straw and chaff. In other arrangements the header can be used on a swather or windrower in which the crop is first cut and laid out by the machine into a swath or windrow for subsequent pickup by a combine.

Headers for combines have in recent years almost exclusively used, as a feed mechanism for transporting the cut crop inwardly to an opening in the combine feeder housing, an auger screw arrangement which is arranged rearwardly of the conventional sickle knife along a front edge of the header. These auger screw arrangements have become universal due to the simplicity of manufacture and due to the effective feeding of the high rates of material harvested by modern machines. It will be appreciated that the rate of movement of the machine across the ground and therefore the rate of cutting of crop has significantly increased over recent years and the auger screw has been found to accommodate such high rates of feeding. In addition the auger screw properly feeds the material into the feeder housing of the combine without causing undue shelling or loss of grain.

There is a requirement in modern machines to yet further increase the working width of the machine so that one pass of a large machine with a wide cutting blade cuts a wider swath of crop and thus reduces the number of passes. This has a number of advantages including reduced fuel usage, less damage to the ground by passes of heavy machinery and reduced working hours to complete the harvesting.

In practice, therefore, the maximum width of a header of this type is of the order of 30 feet and attempts to go beyond this width have met with very little success.

It is one object of the present invention, therefore, to provide an improved header device for a harvesting machine which provides an improved feed mechanism for transporting the cut crop along the header to the discharge opening to the combine.

According to a first aspect of the invention, therefore, there is provided a header for a crop harvesting machine comprising a frame, means for mounting the frame on the machine for transportation in a working direction across a field including a standing crop to be harvested, a knife arrangement extending transversely across a front edge of the frame for cutting the standing crop, means defining an opening rearwardly of the frame through which the cut crop is guided to pass, the frame extending outwardly therefrom to respective sides thereof, a first and a second draper assembly each including a pair of draper guide rollers arranged with the respective axes of rotation extending generally parallel to the working direction, one of said rollers being spaced from the opening to a respective side thereof and the other of said rollers being arranged adjacent said opening to define end of the draper assembly, and a draper canvas arranged rearwardly of said knife arrangement so as to receive the cut crop therefrom and constrained by the rollers to move transversely of the frame towards said end to carry said cut crop toward said opening, a third draper assembly including a pair of draper guide rollers arranged with respective axes extending transversely to said working direction and a draper canvas arranged rearwardly of said knife arrangement and at said ends of the first and second draper assemblies so as to carry said cut crop rearwardly of the frame from said ends to said opening to pass therethrough, a confining and feeding member, and means mounting said confining and feeding member in spaced position above a rear end of said third draper assembly so as to cooperate with said third draper assembly to confine said cut crop and to direct said cut crop to pass through said opening.

Preferably the confining and feeding member comprises a rotatable member which has a central section including a plurality of flexible paddle members which extend outwardly from the roller and lie in angularly spaced axial planes so that the paddles act to feed the material through the opening into the feeder housing. On either side of the central section defined by the paddle members, there can be provided a short auger section of a length significantly less than the length of the portion of the frame extending outwardly to one side from the opening so that substantially the whole of the transportation of the crop along the frame from outer portions thereof toward the opening is carried out by the draper canvas with the third draper canvas and the roller member acting to confine the member into the feeder housing.

Preferably the forward roller of the third draper is positioned with its outside ends beneath the innermost rollers of the first and second drapers. To accommodate this and to maintain the lowest possible angle of the first and second drapers' the forward roller of the third draper is positioned rearwardly of the knife and spaced therefrom The angle of the third draper to the horizontal is less than side to side angle of the first and second drapers so that a gap of increasing width is formed between the end of the first and second drapers and the upper surface of the third draper.

According to a second aspect of the invention, there is provided a header for a crop harvesting machine comprising a frame, means for mounting the frame on the machine for transportation in a working direction across a field including a standing crop to be harvested, a knife arrangement extending transversely across a front edge of the frame for cutting the standing crop, means defining an opening rearwardly of the frame through which the cut crop is guided to pass, the frame extending outwardly therefrom to respective sides thereof, a first and a second draper assembly each including a pair of draper guide rollers arranged with the respective axes of rotation extending generally parallel to the working direction, one of said rollers being spaced from the opening to a respective side thereof and the other of said rollers being arranged adjacent said opening to define end of the draper assembly, and a draper canvas arranged rearwardly of said knife arrangement so as to receive the cut crop therefrom and constrained by the rollers to move transversely of the frame towards said end to carry said cut crop toward said opening, a third draper assembly including a pair of draper guide rollers arranged with respective axes extending transversely to said working direction and a draper canvas arranged rearwardly of said knife arrangement and at said ends of the first and second draper assemblies so as to carry said cut crop rearwardly of the frame from said ends to said opening to pass therethrough, an elongate confining and feeding member having a longitudinal axis transverse to said working direction and extending from a first end spaced inwardly from an outer end of said first draper canvas and a second end spaced inwardly from an outer end of said second draper canvas, means mounting said confining and feeding member in spaced position above a rear end of said third draper assembly and means driving said confining and feeding member to rotate about said axis in a direction to feed material thereunder so as to cooperate with said third draper assembly to confine said cut crop and to direct said cut crop between an underside of said confining and feeding member and an upper surface of said rear end of said third draper canvas to pass through said opening.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

FIG. 6 is a cross-sectional view of the lowermost part only of the device a shown in FIG. 4 on an enlarged scale showing the details of the draper and lower pan.

FIG. 7 is a schematic cross-sectional view of an alternative embodiment of the invention of a type using a conventional auger-type feed arrangement.

Figure 1:
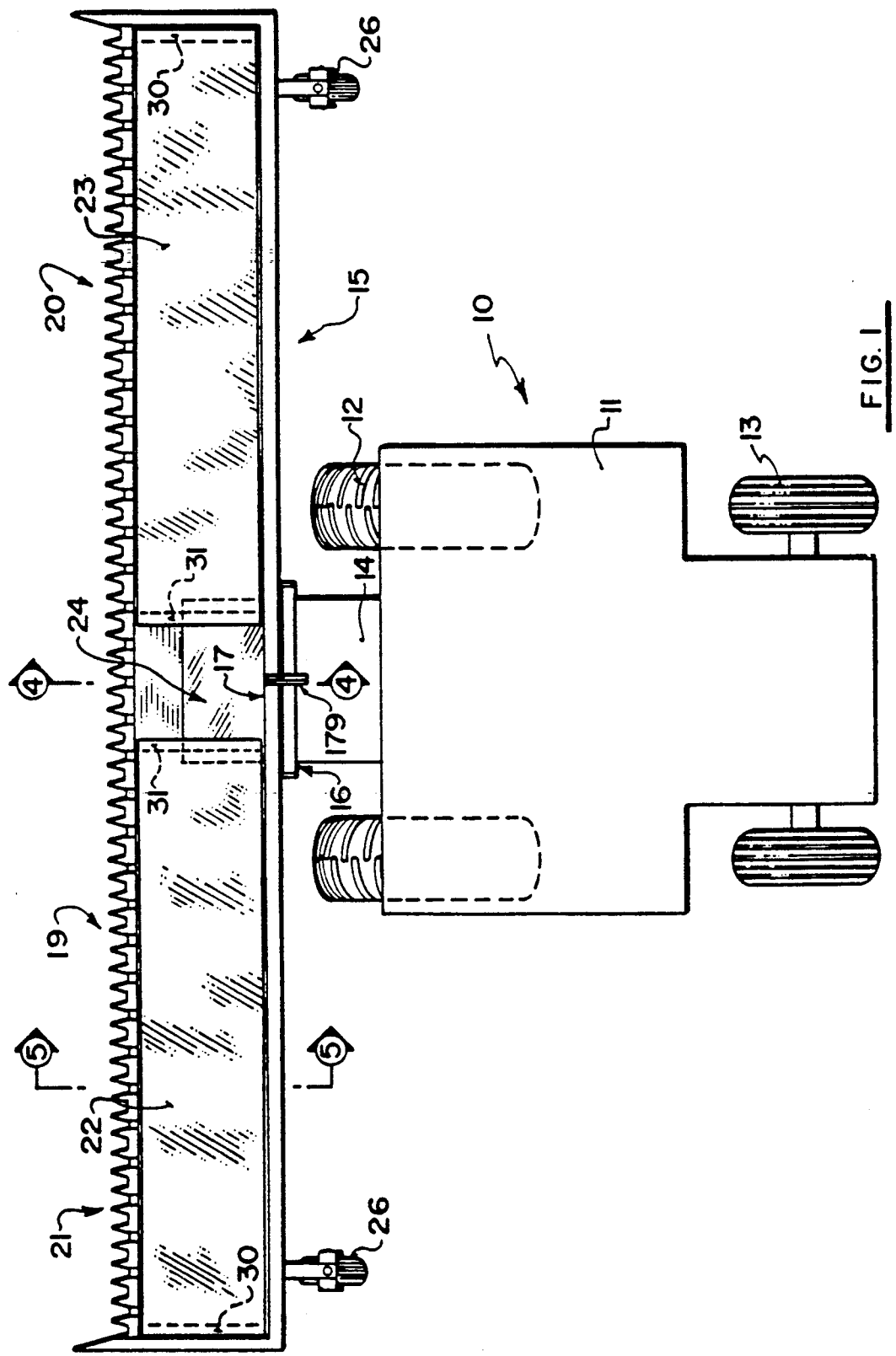
FIG. 1 is a top plan view of a combine harvester including a header according to the present invention.

In FIG. 1 a combine harvester is indicated generally at 10 and comprises a body 11 mounted on ground wheels 12 and 13 which are of conventional construction with the body including a conventional arrangement of beaters, sieves and the like for separating grain from straw and chaff. The body is fed by a feeder housing 14 which again is of conventional construction and in a conventional machine is built separately from a header indicated at 15 so that the combine 10 can be used with different types of header as required by a particular customer.

Thus the feeder housing 14 has attached thereto a front frame or mounting frame 16 to which a central frame portion 17 of the header 15 can be attached simply by suitable bolt or clamp arrangements.

The header comprises the central frame portion 17 which is connected to or integral with a pair of wing frame outer frame portions 19 and 20 which extend respectively out to sides of the combine. In some cases flexibility can be provided between the outer or wing frame portions and the central frame portion. In other cases, the whole unit may constitute a rigid elongate frame. A sickle knife arrangement 21 is mounted across a front edge of the frame portions to present a forwardmost cutting member for engaging and cutting the crop in conventional manner. Each of the wing frame portions 19 and 20 carries a draper assembly 22, 23 which is arranged immediately rearwardly of the sickle knife and movable to carry the cut crop along the wing portion transversely of the direction of motion toward the feeder housing 14. A further draper assembly 24 is positioned at the central frame portion and moves in a direction to transport the material from the ends of the drapers 22 and 23 rearwardly into the feeder housing 14 through an opening therein of conventional construction.

Figure 2:
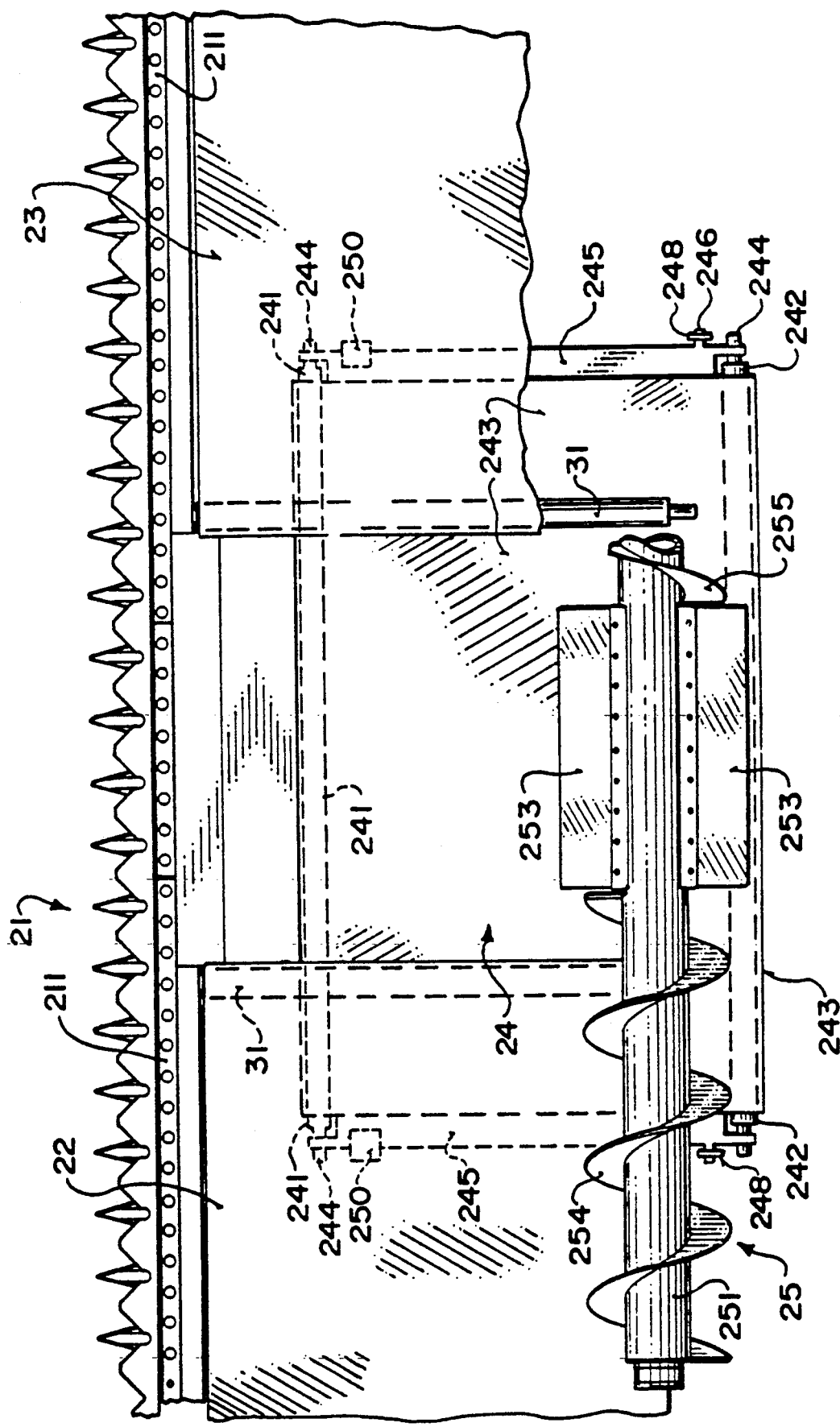
FIG. 2 IS a top plan view of a central portion of the header of FIG. 1 on an enlarged scale.
Figure 3:
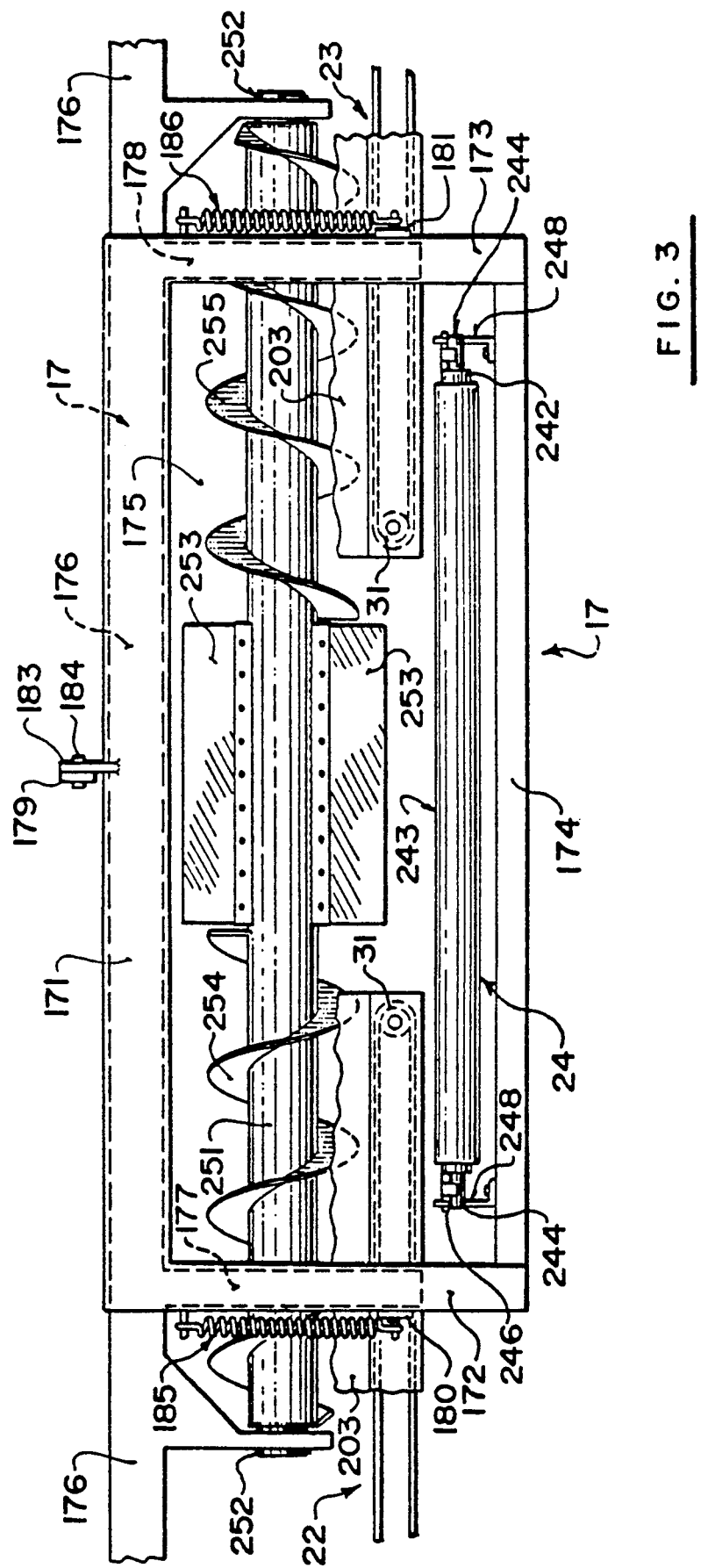
FIG. 3 is rear elevational view of the portion of the header of FIG. 2.
Figure 4:
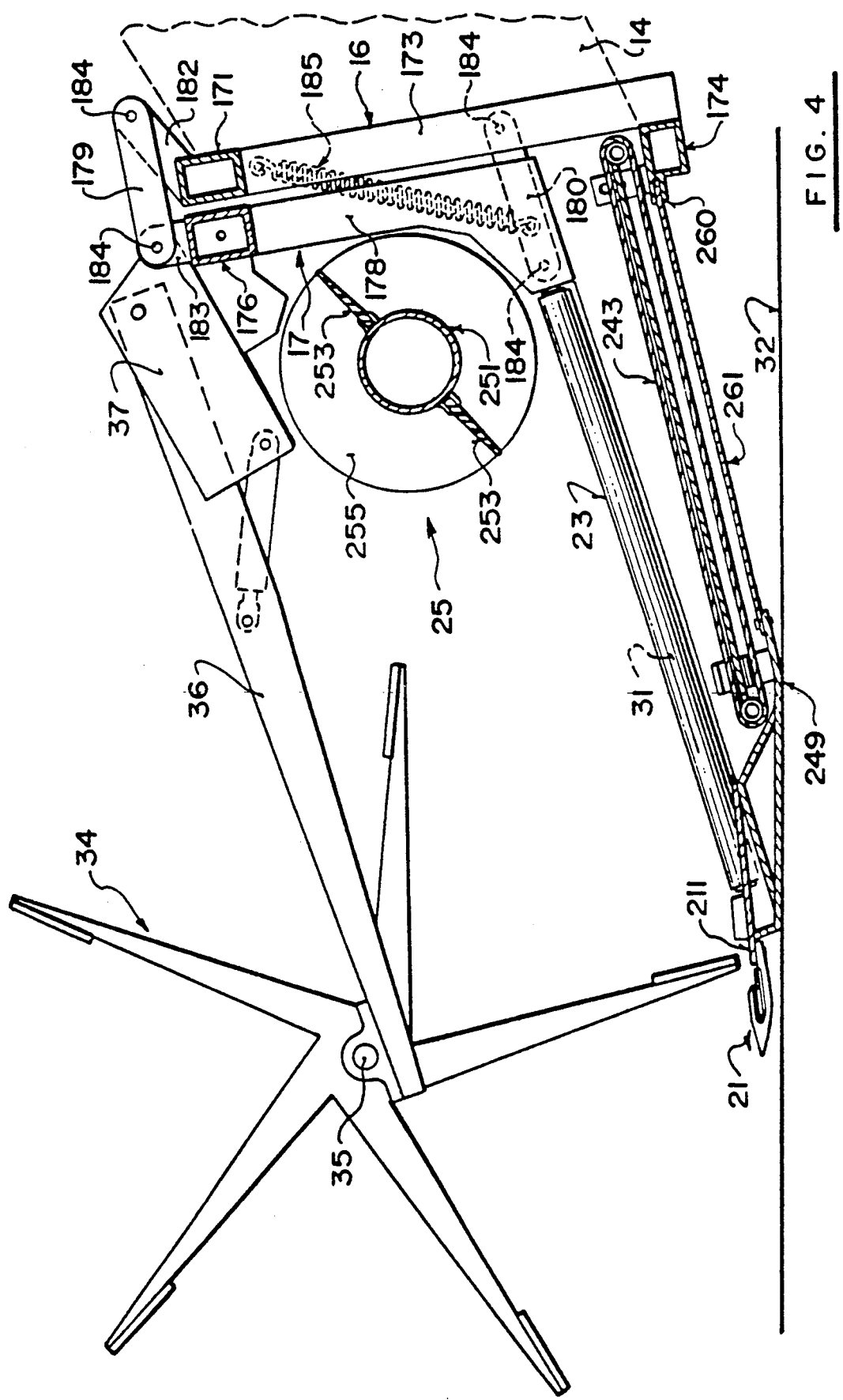
FIG. 4 is a cross sectional view along the lines 4—4 of FIG. 1.

Turning now to FIGS. 2, 3 and 4, the construction of the header at the central frame is shown on larger scale and in more detail. The mounting frame 16 comprises a transverse upper beam 171, a pair of vertical beams 172, 173 and a transverse lower beam 174 thus defining therebetween an opening 175 through which material to be fed can pass to the feeder housing 14 of the combine.

The header frame 17 comprises a rectangular frame including a transverse upper beam 176 which is an elongate beam constituting the main support beam for the header thus extending across the full width of the header and acting to support the components of the header in conventional manner. From the beam 176 extend downwardly a pair of vertical support struts 177 and 178 which are arranged adjacent to the vertical beams 172, 173 of the frame 16.

The header frame 17 is mounted upon the front frame 16 by three pivotal braces 179, 180 and 181. The brace 179 is attached to an upstanding bracket 182 which is attached to the transverse beam 171 and extends rearwardly and upwardly therefrom to a position behind the mounting frame. The brace 179 extends forwardly therefrom and is attached to a bracket 183 mounted upon the beam 176. The brace 179 is mounted substantially centrally of the frame at the upper edge and the braces 180 and 181 are mounted on either side of the frame 16 extending forwardly therefrom and coupled to a respective one of the struts 177, 178 of the frame 17. Pivotal movement of each of the braces is provided relative to its coupling on the respective strut by pivot pins 184. The braces thus provide vertical movement of the header frame relative to the mounting frame 16. The pivot pins of the braces are either rubber mounted or crowned to allow some rotational movement thus allowing limited twisting movement of the header frame bout an axis approximating the centre of the front frame 16 and extending forwardly therefrom so that either end of the header can be lifted to a limited degree to accommodate changes in ground level. The header frame 17 is maintained biased upwardly against its weight by a pair of springs 185 and 186 which interconnect an upper part of the frame 16 to a forward position on each of the braces 180, 181.

The brace and spring arrangement shown is only one example of many different mounting techniques which can be used. As the details of this part of the device do not constitute an important feature of the invention, the device shown is illustrated only schematically and it will be within the knowledge of one skilled in the art to provide a detailed device of this or a similar type.

Turning now to FIG. 6, the draper assembly 24 comprises a pair of rollers 241, 242 with the axes of the rollers arranged transverse to the working direction of the header so that a draper canvas 243 carried by the rollers has an upper run which moves rearwardly toward the opening 175. The rollers 241 and 242 are mounted with their respective shafts 244 carried at respective ends of a plate support 245 which extends between the upper and lower runs of the draper canvas so as to provide a backing support surface for the upper run of the canvas. The shafts 244 are mounted on the plate support 245 fixed against movement. However the plate itself is mounted at a rearward end by pins 246 (only one visible) each movable within a vertical slot 247 of a respective pair of vertical plates 248 carried on the mounting frame for limited vertical movement of the plate 245 and thus the shaft 244 and therefore the roller 242 relative to the transverse beam 174 of the mounting frame.

Figure 5:
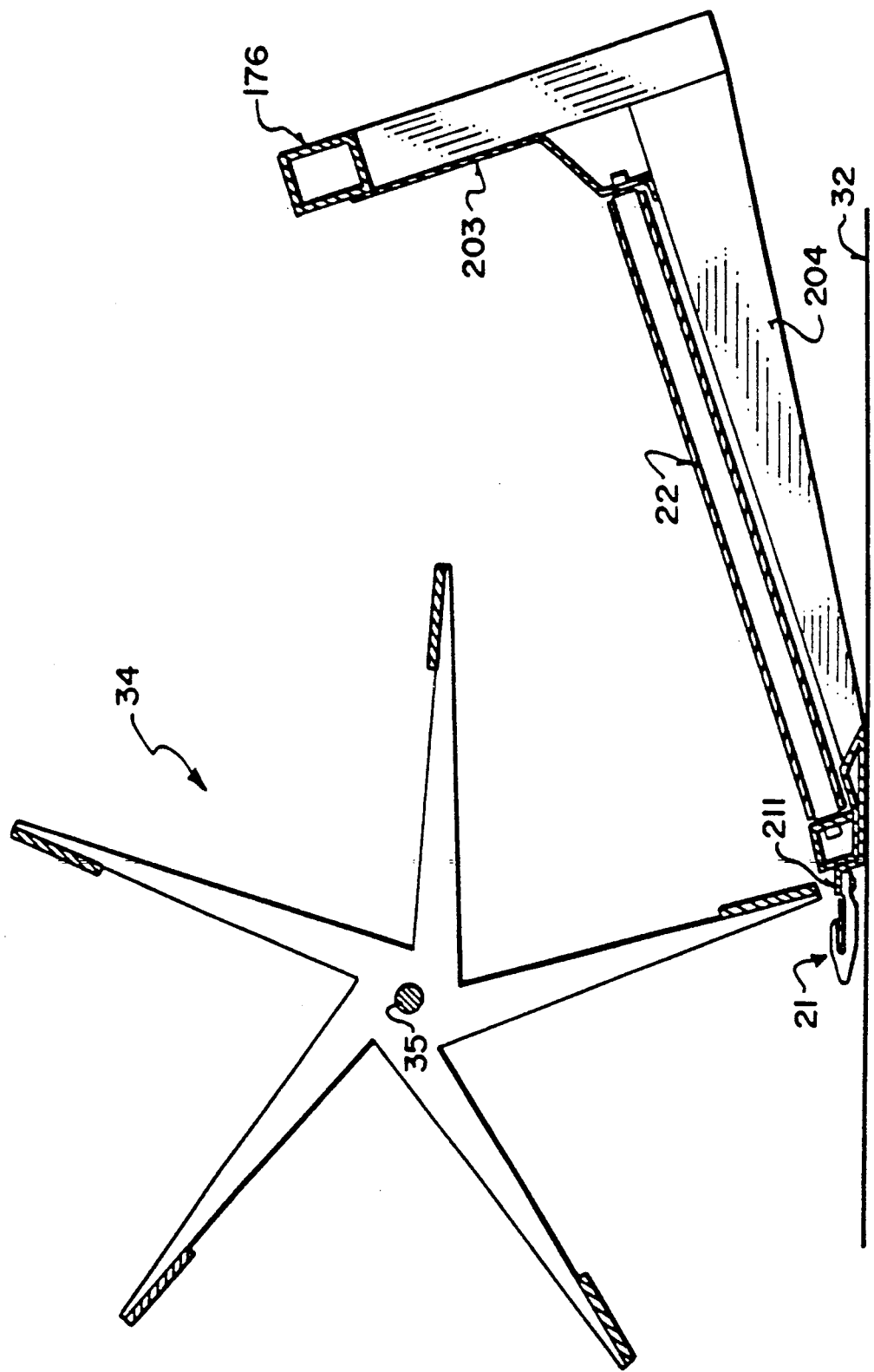
FIG. 5 is a cross sectional view along the lines 5—5 of FIG. 1.

The roller 241 is mounted at a forward end of the plate 245 carried on the header frame at a portion thereof indicated at 249 which is rigidly coupled to and supported by the beam 176 by the conventional forwardly extending struts 204 shown in FIG. 5. The frame portion 249 thus is moveable with the header frame 17 relative to the front frame 16 and particularly the lower transverse beam 174 on which the roller 242 is mounted. The forward end of the plate 245 and thus the roller 241 is mounted on the frame portion 249 in a similar manner to the mounting of the roller 242 allowing vertical movement of the other relative to the frame portion 249.

In this case, the plate 245 is constrained for limited vertical movement by two horizontal plates 250 which confine an edge of the plate 245. This mounting arrangement allows both the limited vertical movement required and a horizontal sliding movement necessary to accommodate changes in distance between the frame members 174 and 249 caused by the movement of the header frame. The tension of the draper canvas is maintained by the fixed spacing of the rollers 241 and 242 carried on the plate 245.

Interconnecting a rearward edge 251 of the frame portion 249 and a forward edge 260 of the transverse beam 174 is a pan 261 which underlies the canvas 243 to prevent the escape of grain from the header in that area, the pan is a flat sheet of steel of thin gauge.

A forward edge of the pan as shown in FIG. 6 is attached to the beam 249 by way of a rod 262 carried at the edge 251 so as to extend along the edge. Thus the front edge of the pan includes a U-shaped hook portion 263 wrapped around the rod 262 to allow pivotal movement of the front edge of the pan relative to the edge 251. A trailing edge of the pan is mounted for sliding movement between an underside of the edge 260 and an upper surface of a rod 265 positioned under the edge 260 and defining with the forward edge 260 a channel which engages around the trailing edge of the pan so that the pan edge can slide in a direction longitudinal to the pan to take up changes in the distance between the frame members 249 and 174 caused by the pivotal and lifting movement of the header frame. The rod is positioned slightly forwardly of the edge 260 so that the pan can pivot in a clockwise direction relative to the view shown in FIG. 6 to accommodate any pivotal movement necessary at that end.

The pan is formed of a thin sheet of a suitable gauge metal of sufficient strength that it does not droop under its weight or the weight of material upon it. It also is sufficiently flexible that it can flex about axes generally longitudinal to the working direction to accommodate the twisting movements of the header frame. For this reason, the pan must be free of rigid support elements in a transverse direction but may include longitudinal support element along the sides. Such may comprise merely a folded edge as shown at 264, or may comprise tubular struts (not shown) which can provide rear to front thrust to propel a forward edge of the header.

The pan thus acts to seal the area between the header and the front of the opening 175 at the lower surface to prevent material falling from the header. Material to the sides and above the opening 175 is suitably confined by the transporting arrangements described.

The roller 241 is arranged, spaced rearwardly of the sickle knife arrangement 21 and particularly rearwardly of the bar 211 which supports the sickle knife and is of conventional construction.

The central frame 17 also carries a roller member 25 which is omitted from the illustration of FIG. 1 for convenience but is shown clearly in FIGS. 2, 3 and 4. The roller member 25 comprises the shaft 251 which is rotatably mounted in bearings 252 carried by the frame 17 on suitable supports. The shaft 251 may have at a central section thereof extending over only a part of the length thereof a paddle section defined by a pair of flexible paddle members 253 Which are mounted in an axial plane of the shaft 251 and are spaced anqularly by 180°. Outwardly of the paddle section is arranged a pair of auger screw flights 254, 255 which are angled so as to cause an inward movement on rotation of the shaft 251 in an anticlockwise direction as viewed in FIG. 4 so that it will be appreciated therefore that the roller member 25 and the draper 24 cooperate in their rotation to tend to feed material rearwardly from the central frame portion through the opening 175 into the feeder housing 14 of the combine. In particular, the paddle blades 253 act at the very centre of the opening to bat or paddle the material rearwardly thus tending to confine it toward the draper 24 so that it can properly pass through the opening in the feeder housing, which as previously explained is generally smaller than the opening 175 in the frame.

The auger sections 254 and 255 tend to move material toward the paddle seCtion so as again to confine the material and direct it inwardly and downwardly for cooperation with the draper 24 through the opening into the feeder housing.

The header frame including the central portion and the wing portions 20 and 21 comprises the upper tubular frame member 176 and a rear sheet 203 best shown in FIGS. 5 but omitted for convenience in FIG. 3 which extend outwardly from the central frame to a remote outer end of the wing frame section. The vertical support struts two of which are shown at 177 and 178 are attached to the lower channel structure section 204 which extends forwardly and carries the sickle knife bar 211. At the centre of the wing frame portions, there is provided the frame members 249 for supporting the ends of the roller 241.

Adjacent the outer end of each of the wing sections is mounted a gauge wheel 26. The springs 185, 186 are arranged to have sufficient spring force so that only a small proportion of the weight of the wing section rests upon the gauge wheel 26 so that the gauge wheel can run over the ground and can readily raise and lower the wing section in dependence upon the height of the ground relative to frame 16.

The gauge wheel 26 can themselves be spring mounted so that the header is softly suspended and floating in its action to ground level changes.

Each of the wing sections carries a pair of rollers 30 and 31 with the rollers 31 positioned at an innermost end of the wing sections and the rollers 30 at an outermost end for receiving and moving a draper canvas 22, 23. The draper canvas is positioned immediately rearward of the bar 211 so that any cut crop drops from the knife directly onto the canvas for moving in parallel fashion transversely along the frame toward the draper 24. The rollers 31 as shown in FIG. 3 are mounted on the rear sheet 203 as best shown in FIGS. 5.

As best shown in FIG. 4, the roller 31 is positioned immediately rearwardly of and mounted upon the bar 211 and extends rearwardly therefrom to a rear edge of the wing section adjacent the lower tube 174. The angle of the upper surface of the draper 23 is of the order of 18° relative to the intended ground direction or horizontal which is a sufficiently small angle to allow the crop to fall properly onto the draper and be carried thereby in parallel aligned relationship. A significantly increased angle of the draper tends to reduce the effectiveness of the transport of the crop so that it can bunch up and plug the machine by failure to remain in the proper parallel orientation In addition it will be noted from FIGS. 4 and 5 that the draper is positioned at its forward end as close to the ground as possible and immediately rearward of the bar 211 so that there is very little or no step behind the sickle knife before the crop falls onto the draper. Thus with the sickle knife closely adjacent the ground indicated at 32, the forwardmost edge of the lower run almost contacts the ground and is spaced therefrom solely by the thickness of the pan extending beneath the draper.

The forward roller 241 of the draper 24 is spaced rearwardly from the bar 211 by a sufficient distance that it can extend beneath the lower run of the drapers 22 and 23 and specifically beneath the innermost rollers 31 thereof. Such a distance may be of the order of 9 inches to 18 inches and provides a condition in which the outer edges of the draper 24 lie underneath the lower run of the drapers 22 and 23. This prevents material from wrapping the drapers 22 and 23 and jamming between the drapers 22, 23 and the draper 24. Furthermore this jamming is inhibited by the fact that the angle of the draper 24 to the horizontal is slightly less than the angle of the drapers 22 and 23 so that the gap between the upper run of the draper 24 and the lower run of the drapers 22 and 23 gradually increases as it approaches the opening 175.

The sickle knife 21 is generally of conventional construction and may provide an overlapped section between two sickle knife drive bars at the centre line of the header. Such an arrangement is clearly described and claimed in co-pending Canadian Application No. 496,789 filed on Dec. 3, 1985 corresponding to U.S. Application No. 806,472 filed on Dec. 9, 1985 and assigned to the assignee to the present application.

The reel generally indicated at 34 is omitted from FIGS. 1, 2 and 3 for convenience of illustration but is shown in FIGS. 4 and 5. The reel includes a support shaft 35 on which is mounted a plurality of bats (not shown) by suitable support fins. The reel may be of conventional construction or may be of the type illustrated and claimed in co-pending Canadian Application No. 492,755 filed Oct. 10, 1985 and corresponding to U.S. Application No. 788,335 filed Oct. 17, 1985, now U.S. Pat. No. 4,776,155 both assigned to the assignees of the present application.

The arrangement in which the roller 242 and the rear edge of the pan 261 are mounted upon the front frame 16 of the feeder housing 14 while the front roller 241 and the front edge of pan 261 are mounted upon the header frame allows the canvas 243 to properly control the feed of the material into the feeder housing while twisting movement of the header relative to the front frame 16 is taken up by twisting of the draper canvas and the sealing pan. This allows a rigid one piece header to follow the ground or float laterally with respect to the feeder housing and thus with respect to the propelling vehicle. As explained previously the mounting of the header by way of the pivotal braces allows a limited degree of floating movement both in a twisting direction and in a lifting direction and this is taken up by flexing of the canvas 243 and the sealing pan 261. As the rear end of the canvas and the sealing pan remain properly positioned relative to the feeder housing, it is ensured that the feed of the material into the feeder housing is maintained without any openings which vary in dependence upon the movement of the header.

In addition, the mounting of the rollers 241 and 242 in the mounting brackets which allow a limited vertical movement of each of the rollers allows problems in feeding of the material to be overcome. Generally, the weight of the rollers and the canvas and support plate hold the rollers at the bottom limit of the slot mountings. However, in some cases material tends to backfeed under the draper canvas and could, if the canvas were rigidly mounted, wedge between the draper canvas and the pan. Allowing the draper on the rollers to float vertically in this manner prevents draper stoppage and allows it to clear this obstruction. In this way material which would otherwise become wedged underneath the draper canvas merely causes a slight lifting movement of the draper canvas while the material tends to be fed forwardly relative to the machine direction to pass around the front roller 241 to rejoin material passing across the upper run of the canvas 243. While both of the rollers 241 are mounted for the limited vertical movement at both ends thereof, in some cases mounting of only one of the rollers in this manner is necessary or mounting of any one end of the roller for vertical movement may also achieve the same result.

Turning now to FIG. 7, there is shown an alternative arrangement employing on the combine a conventional auger-type header. In FIG. 7 the feeder housing is indicated at 1 including a feeder chain 1A for transporting the crop in the direction of the arrow 1B. The feeder housing can be raised and lowered by a linkage indicated at 1C pivotally coupled to a bracket lD at a lower edge of the feeder housing.

On a front face of the feeder housing is provided a mounting frame 1E which includes a lug 1F shown schematically as carried on the upper surface of the feeder housing.

The header indicated at 2 comprises a conventional feed auger 3, a reel 4 and a cutter bar 5 and is attached to feeder housing 1 by way of two upper links 6 and two lower links 7. The upper links 6 are arranged on either side of the feeder housing with rear pivot points mounted on the lugs 1F of the feeder housing and front pivot points mounted on the header frame at an upper beam 2A thereof. The lower links 7 have rear pivot points mounted on the mounting frame 1E at a lower beam thereof and front pivot points attached to the header frame at pivot couplings 7A.

A pan 8 is provided which follows substantially the line of the lower links 7 and connects from a beam at the pivot coupling 7A of the header 2 to the beam at the lower portion of the mounting frame 1E.

The pan is substantially as shown in FIG. 6 in that the pan is coupled between a fixed mounting at one edge and a sliding coupling at the other edge. In this case as the material is moving rearwardly across the pan, it is necessary to ensure that the pan at the rear edge thereof lies on top of the surface to which it is attached. This can be achieved by bolting the pan on the top surface and sliding the forward edge thereof. Alternatively the forward edge can be bolted and the rear edge can slide on top of the surface of the frame element to which it is engaged. In place of the slot type confinement shown in FIG. 6, it is possible to confine the trailing edge of the pan merely by slightly bowing the pans so that its own spring tension causes the trailing edge to be pressed downwardly onto the surface on which it slides.

I claim:

1. A header for a crop harvesting machine comprising a frame, means for mounting the frame on the machine for transportation in a working direction across a field including a standing crop to be harvested, a knife arrangement extending transversely across a front edge of the frame for cutting the standing crop, means defining an opening rearwardly of the frame through which the cut crop is guided to pass, the frame extending outwardly therefrom to respective sides thereof, a first and a second draper assembly each including a pair of draper guide rollers arranged with the respective axes of rotation extending generally parallel to the working direction, one of said rollers being spaced from the opening to a respective side thereof and the other of said rollers being arranged adjacent said opening to define an end of the draper assembly, and a draper canvas arranged rearwardly of said knife arrangement so as to receive the cut crop therefrom and constrained by the rollers to move transversely of the frame towards said end to carry said cut crop toward said opening, a third draper assembly including a pair of draper guide rollers arranged with respective axes extending transversely to said working direction and a draper canvas arranged rearwardly of said knife arrangement and at said ends of the first and second draper assemblies so as to carry said cut crop rearwardly of the frame from said ends to said opening to pass therethrough, an elongate confining and feeding member comprising a shaft having a longitudinal axis transverse to said working direction and extending across a width of the header substantially equal only to the width of the opening, said shaft carrying auger flight means extending along at least a part of the length of the shaft so as to include at least a part thereof aligned with the opening, means mounting said confining and feeding member with said flight means above a rear end of said third draper assembly and with an edge of the flight means spaced from a surface of the third draper assembly and means driving said confining and feeding member to rotate about said axis in a direction to feed material thereunder so that the flight means cooperates with said third draper assembly to confine said cut crop and to direct said cut crop between an underside of said flight means and an upper surface of said rear end of said third draper canvas to pass through said opening.

2. The invention according to claim 1 wherein said confining and feeding member comprises an elongate member having a longitudinal axis transverse to said working direction and wherein there is provided means driving said confining and feeding member to rotate about said longitudinal axis in a direction to feed material thereunder.

3. The invention according to claim 2 where in said confining and feeding member comprises a roller having feed members extending outwardly from an exterior surface thereof for engaging and directing said crop through said opening.

4. The invention according to claim 3 when the feed members are flexible.

5. The invention according to claim 3 wherein in the feed members comprise paddles each lying in an axial plane of said roller with the feed members being spaced angularly of said roller.

6. The invention according to claim 2 wherein said confining and feeding member includes auger flight means on an exterior surface thereof for rotation therewith and arranged relative to the direction of rotation of the member to generate a movement of said crop inwardly towards said opening and parallel to said first and second draper assemblies.

7. The invention accordingg to claim 1 wherein said confining and feeding member has a first end spaced inwardly from an outer end of said first draper canvas and a second end spaced inwardly from an outer end of said second draper canvas.

8. The invention according to claim 2 wherein said confining and feeding member member includes a plurality of paddle members on a section thereof adjacent said opening and a pair of auger flight means on respective ends thereof, the auger flight means being arranged relative to the direction of rotation of said member so as to cause a movement in said crop inwardly towards said opening.

9. The invention according to claim 1 wherein said third draper assembly has side edges arranged such that each side edge thereof lies beneath a respective end of said first and second draper assemblies.

10. The invention according to claim 9 wherein the spacing between a respective side edge of the third draper canvas and the end of a respective one of the first and second draper assemblies increases in a direction from said knife arrangement toward said opening.

11. The invention according to claim 9 wherein the first and second draper canvasses each have a side edge arranged substantially immediately rearwardly of said knife arrangement and wherein a forward one of said rollers of said third draper assembly is positioned rearwardly of said knife arrangement by a sufficient distance that the roller can extend beneath the end rollers of said first and second draper assemblies.

12. A header for a crop harvesting machine comprising a frame, means for mounting the frame on the machine for transportation in a working direction across a field including a standing crop to be harvested, a knife arrangement extending transversely across a front edge of the frame for cutting the standing crop, means defining an opening rearwardly of the frame through which the cut crop is guided to pass, the frame extending outwardly therefrom to respective sides thereof, a first and a second draper assembly each including a pair of draper guide rollers arranged with the respective axes of rotation extending generally parallel to the working direction, one of said rollers being spaced from the opening to a respective side thereof and the other of said rollers being arranged adjacent said opening to define an end of the draper assembly, and a draper canvas arranged rearwardly of said knife arrangement so as to receive the cut crop therefrom and constrained by the rollers to move transversely of the frame towards said end to carry said cut crop toward said opening, a third draper assembly including a pair of draper guide rollers arranged with respective axes extending transversely to said working direction and a draper canvas arranged rearwardly of said knife arrangement and at said ends of the first and second draper assemblies so as to carry said cut crop rearwardly of the frame from said ends to said opening to pass therethrough, an elongate confining and feeding member comprising a shaft having a longitudinal axis transverse to said working direction and extending from a first end spaced inwardly from an outer end of said first draper canvas and a second end spaced inwardly from an outer end of said second draper canvas, said shaft carrying means projecting from an outer peripheral surface thereof and rotatable therewith for engaging the crop, means mounting said shaft and projecting means at a position above a rear end of said third draper assembly and means driving said confining and feeding member to rotate about said axis in a direction to feed material thereunder so as to cooperate with said third draper assembly to confine said cut drop and to direct said cut crop between an underside of said confining and feeding member and an upper surface of said rear end of said third draper canvas to pass through said opening.

13. The invention according to claim 12 wherein said confining and feeding member comprises a roller having feed members extending outwardly from an exterior surface thereof for engaging and directing said crop through said opening.

14. The invention according to claim 13 wherein the feed members are flexible.

15. The invention according to claim 13 wherein the feed members comprise paddles each lying in an axial plane of said roller with the feed members being spaced angularly of said roller.

16. The invention according to claim 12 wherein said confining and feeding member includes auger flight means on an exterior surface thereof for rotation therewith and arranged relative to the direction of rotation of the member to generate a movement of said crop inwardly towards said opening and parallel to said first and second draper assemblies.

17. The invention accordingg to claim 12 wherein said confining and feeding member includes a plurality of paddle members on a section thereof adjacent said opening and a pair of auger flight means on respective ends thereof, the auger flight means being arranged relative to the direction of rotation of said member so as to cause a movement in said crop inwardly towards said opening.

18. The invention according to claim 12 wherein said third draper assembly has side edges arranged such that each side edge thereof lies beneath a respective end of said first and second draper assemblies.

19. The invention according to claim 18 wherein the spacing between a respective side edge of the third draper canvas and the end of a respective one of the first and second draper assemblies increases in a direction from said knife arrangement toward said opening.

20. The invention according to claim 18 wherein the first and second draper canvasses each have a side edge arranged substantially immediately rearwardly of said knife arrangement and wherein a forward one of said rollers of said third draper assembly is positioned rearwardly of said knife arrangement by a sufficient distance that the roller can extend beneath the end rollers of said first and second draper assemblies.

* * * * *